United States Patent [19]

Jeong

[11] Patent Number: 5,781,697
[45] Date of Patent: Jul. 14, 1998

[54] METHOD AND APPARATUS FOR AUTOMATIC RUNNING CONTROL OF A ROBOT

[75] Inventor: Joon-Young Jeong, Seoul, Rep. of Korea

[73] Assignee: Samsung Electronics Co., Ltd., Suwon, Rep. of Korea

[21] Appl. No.: 458,807

[22] Filed: Jun. 2, 1995

[51] Int. Cl.⁶ .................................................. G06G 7/00
[52] U.S. Cl. ........................ 395/3; 395/85; 395/82
[58] Field of Search ........................ 395/3, 80–89; 318/587

[56] References Cited

U.S. PATENT DOCUMENTS

| | | | |
|---|---|---|---|
| 4,809,175 | 2/1989 | Hosaka et al. | 364/424 |
| 4,908,556 | 3/1990 | Dagget et al. | 318/568 |
| 5,378,969 | 1/1995 | Haikawa | 318/568.12 |
| 5,400,244 | 3/1995 | Watanabe et al. | 364/424.02 |
| 5,434,489 | 7/1995 | Cheng et al. | 318/568.15 |
| 5,456,332 | 10/1995 | Borenstein | 180/167 |
| 5,545,960 | 8/1996 | Ishikawa | 318/587 |

*Primary Examiner*—Tariq R. Hafiz
*Attorney, Agent, or Firm*—Burns, Doane, Swecker & Mathis, L.L.P.

[57] ABSTRACT

The present invention relates to an automatic running control apparatus of a robot and a method thereof by which a fuzzy logic rule is performed utilizing data on a running direction, a running distance and an obstacle when a self-propelled mobile robot runs along a rectilinear distance, so that the robot can avoid the obstacle in the running direction, and at the same time, the robot can run accurately to a target point maintaining a predetermined running speed.

7 Claims, 13 Drawing Sheets

| POSITION \ DIRECTION | Lb | Ls | Z | Rs | Rb |
|---|---|---|---|---|---|
| L | Lb | Lb | Ls | Z | Rs |
| Z | Lb | Ls | Z | Rs | Rb |
| R | Ls | Z | Rs | Rb | Rb |

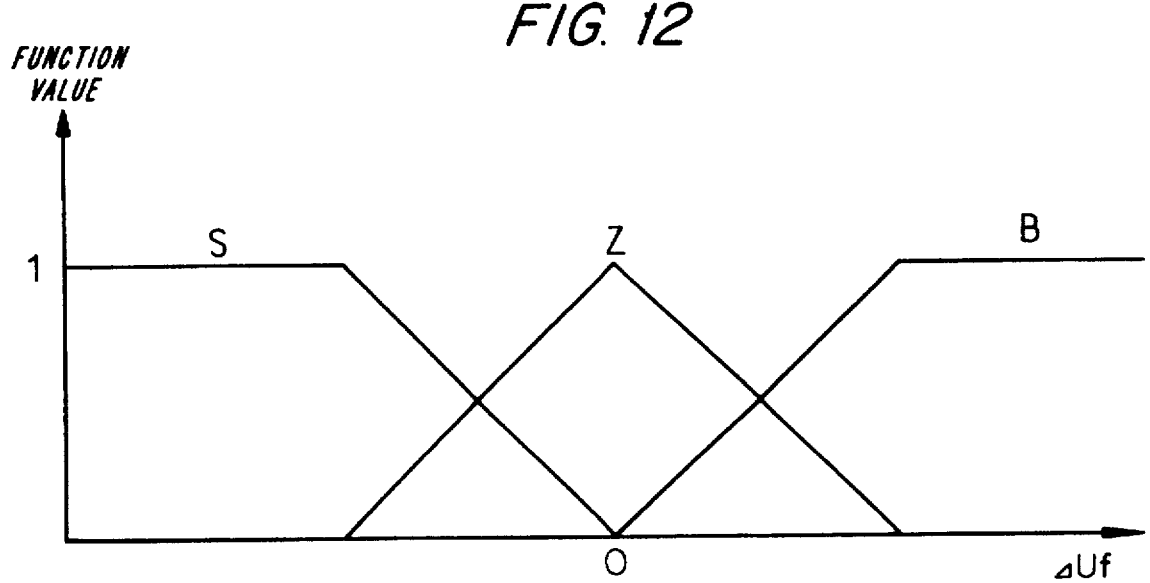

FIG. 13

| | POSITION | DIRECTIONAL ANGLE | INSTANTANEOUS DIRECTIONAL ANGLE | WEIGHT |
|---|---|---|---|---|
| 1 | L | R | L | 1 |
| 2 | L | L | L | 3 |
| 3 | R | R | R | 1 |
| 4 | R | L | R | 3 |
| 5 | L | R | R | 5 |
| 6 | L | L | R | 1 |
| 7 | R | R | L | 5 |
| 8 | R | L | L | 1 |

METHOD AND APPARATUS FOR AUTOMATIC RUNNING CONTROL OF A ROBOT

BACKGROUND

1. Field of the Invention

The present invention relates to an automatic running control apparatus of a robot and a method thereof by which a fuzzy (fuzzy logic) rule is performed utilizing data on a running direction, a running distance and an obstacle when a self-propelled mobile robot runs along a rectilinear distance, so that the robot can avoid the obstacle in the running direction, and at the same time, the robot can run accurately to a target point maintaining a predetermined running speed.

2. Description of the Related Art

Generally, in a conventional self-propelled mobile robotic system, a robot is designed to move along guarded lines and the like preset on a travel route.

However, the robotic system has developed, in line with environmental changes and improvement of technical levels thereof, to a point where the robot moves to a work area repeatedly and by itself along the travel route under a state of its studied running of the route and the work area and a memorized state thereof, and the robot performs a reciprocal running within the work area to thereby carry out a given work load.

The self-propelled mobile robot, in running along the preset route, is supposed to read an originally set target point, even though there is an obstacle along the travel route, to thereby avoid the same and to perform the given work load.

There is a problem in the circumstances described as above, in that the robot abandons its original route, instead of establishing other routes where there is no obstacle to keep running, to thereby arrive at the target point accurately, but its working speed is slowed or the work load along the original travel route cannot be carried out.

SUMMARY

The present invention is disclosed to solve the above-mentioned problem and it is an object of the present invention to provide an automatic running control apparatus of a robot and a method thereof by which a self-propelled robot can detect running distance running direction and whether or not there is an obstacle, when the same runs along a rectilinear distance, to thereby perform a fuzzy rule according to data detected therefrom, so that the robot can maintain a running speed without swaying off a normal track to therby reach the target point without any deviation.

In accordance with one aspect of the present invention, there is provided an automatic running control apparatus of a robot, the apparatus comprising:

running distance detecting means for detecting a distance the robot has covered;

directional angle detecting means for detecting whether or not there is any change in running direction;

position discriminating means for performing an operation for a present absolute position of the robot based on data detected by the directional angle detecting means;

obstacle detecting means for detecting whether or not there is an obstacle around the robot and for detecting a distance to the obstacle;

obstacle position operation means for performing an operation for a comparative position of the robot of utilizing information obtained from the directional angle detecting means and obstacle detecting means;

obstacle avoidance fuzzy inference means for performing a fuzzy inference for determining the running direction of the robot by utilizing information obtained from the obstacle position operation means;

rectilinear running fuzzy inference means for performing the fuzzy inference for rectilinear running of the robot by utilizing information obtained from the position discriminating means;

constant speed running fuzzy inference means for performing the fuzzy inference for a speed control of the robot by utilizing a running speed data obtained from the running distance detecting means and a distance data to the obstacle obtained from the obstacle detecting means; and driving control means for controlling a movement of the robot according to a result obtained by performance of operation and fuzzy inference for each above means.

In accordance with another aspect of the present invention, there is provided an automatic running control method of a robot, the method comprising the steps of:

discriminating an obstacle position for discrimination whether or not the obstacle exists within an avoidance domain (allowable running error range of the robot) after detection is made on running distance to the left side and right side, displacement angle and whether or not there is an obstacle, to thereby perform an operation for the distance to the obstacle, position operation and directional angle when the robot is initialized to thereby start to drive;

discriminating a running speed for discriminating whether the running speed is fast, slow or normal after an operation is performed for weight (n) about a final running direction and an obstacle avoidance running of the robot and determination is made on a direction control output value, when it is discriminated at the obstacle position discriminating step that the robot is within the avoidance domain; and discriminating a continuous running for determining a constant speed control output value when it is discriminated that the running speed of the robot is normal at the running speed discriminating step and for stopping an automatic running of the robot when it is discriminated that the robot is not continuously running after a final motor driving control output value is output according to the determined constant speed control output value to thereby discriminate whether the robot keeps running.

BRIEF DESCRIPTION OF THE DRAWINGS

For fuller understanding of the nature and objects of the invention, reference should be made to the following detailed description taken in conjunction with the accompanying drawings in which:

FIG. 11 is a schematic diagram for illustrating in a discrete tabulation an output fuzzy function against the speed of the constant speed running fuzzy inference means and the distance to the obstacle;

FIG. 12 is a schematic diagram for illustrating a function corresponding to constant speed control output variation magnitude according to the constant running fuzzy inference;

FIG. 13 is a schematic diagram for illustrating a tabulation for seeking a weight of the rectilinear control output variation magnitude according to the fuzzy inference;

DETAILED DESCRIPTION OF THE INVENTION

A preferred embodiment of the present invention will now be described in detail with reference to the accompanying drawings.

Figure 1:
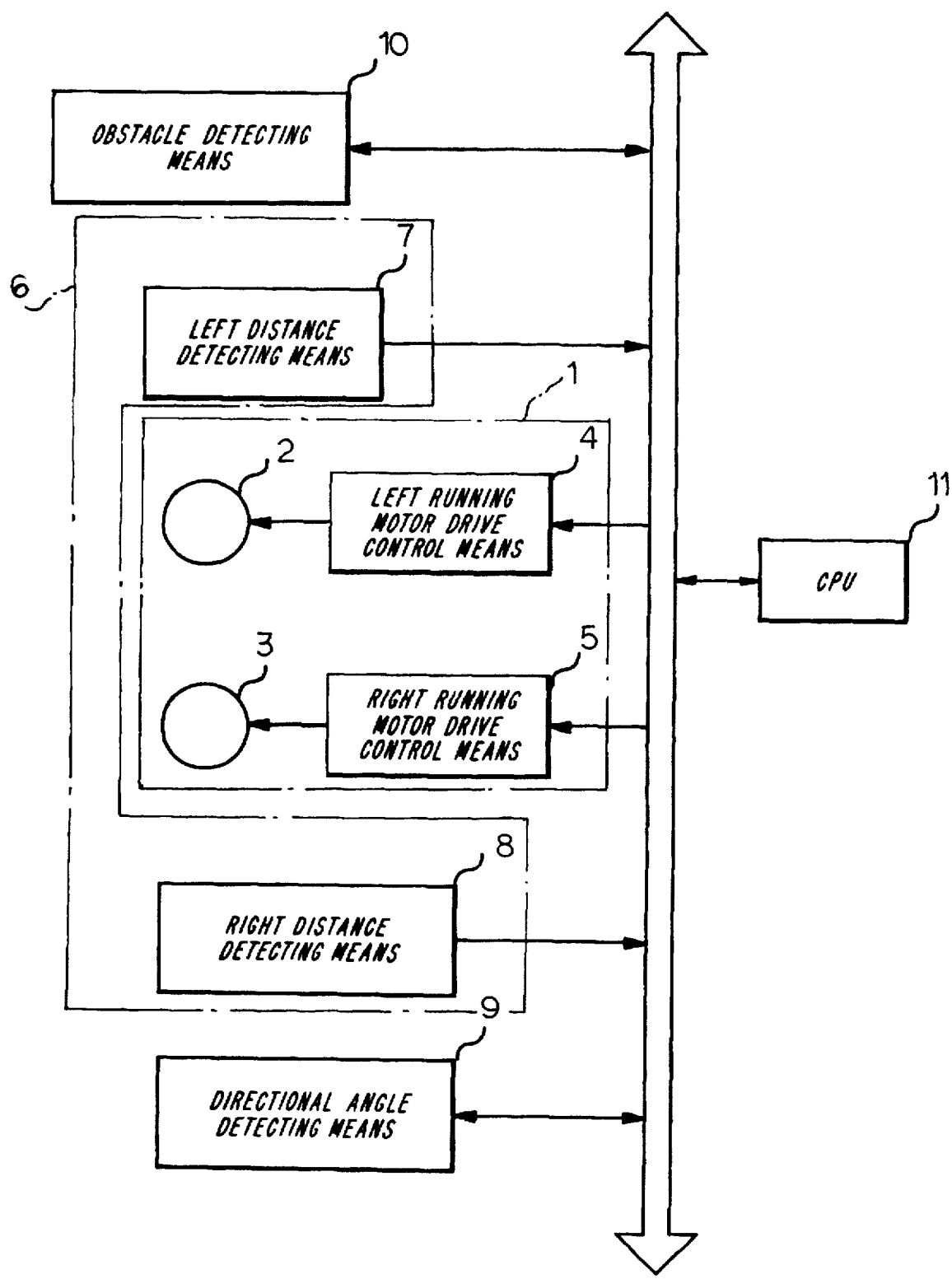
FIG. 1 is a block diagram for illustrating an automatic running control apparatus of a robot according to an embodiment of the present invention.
Figure 2:
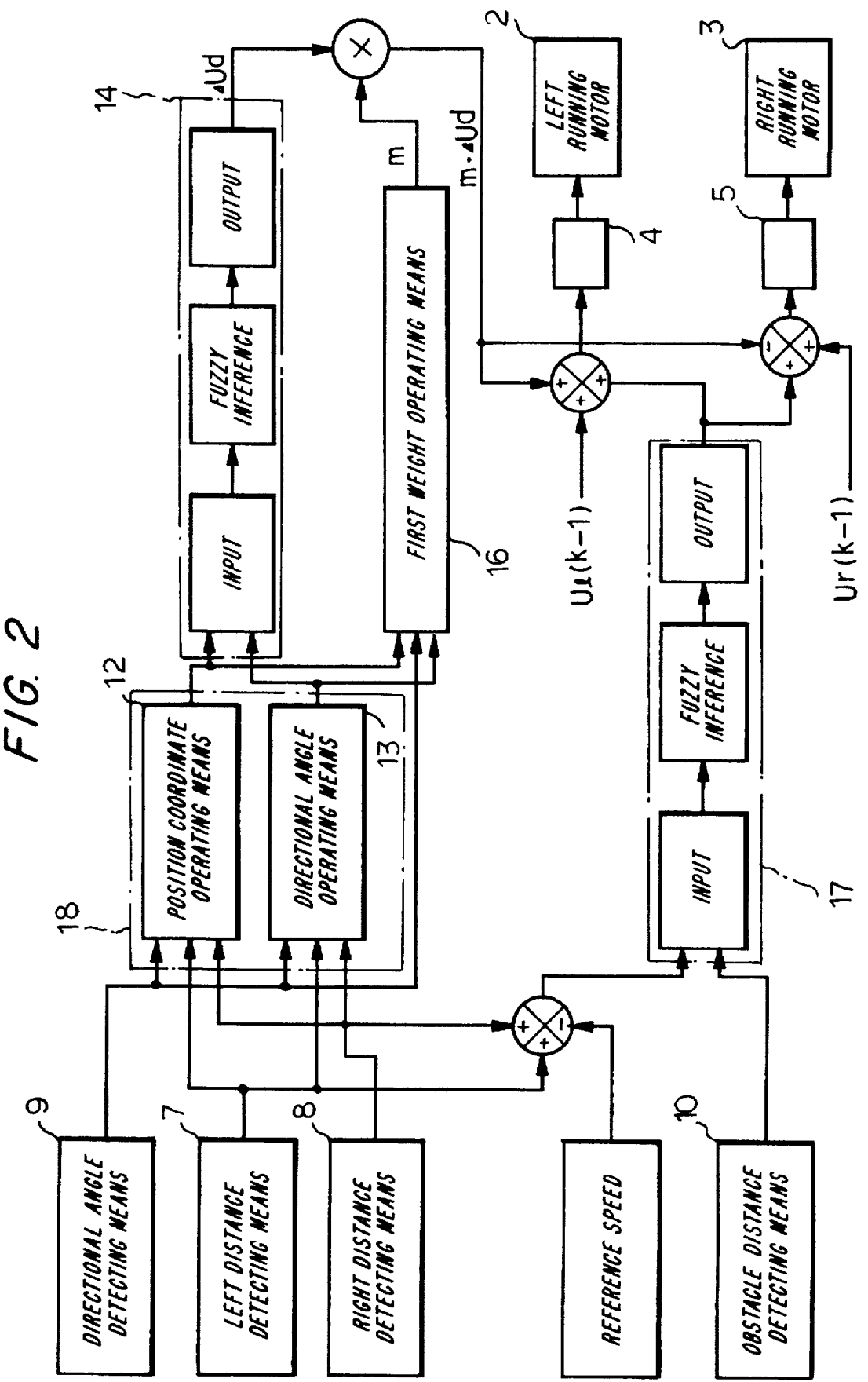
FIG. 2 is a block diagram for illustrating a fuzzy inference apparatus of a rectilinear running of the robot according to an embodiment of the present invention.
Figure 3:
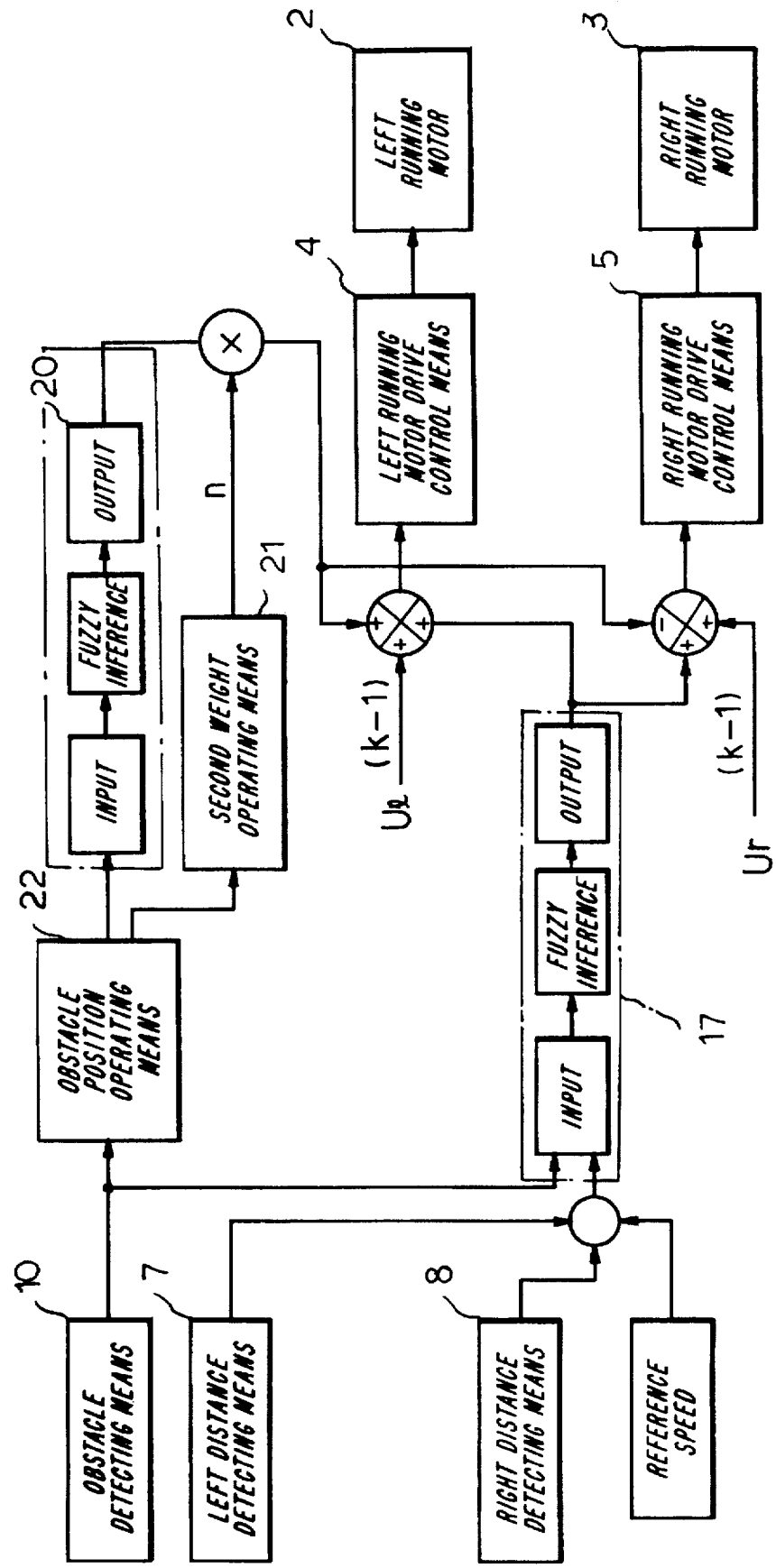
FIG. 3 is a block diagram for illustrating she fuzzy inference apparatus of an obstacle avoidance running of the robot according to an embodiment of the present invention.

FIG. 1 is a block diagram for illustrating an automatic running control apparatus of a robot according to an embodiment of the present invention, FIG. 2 is a block diagram for illustrating a fuzzy inference apparatus of a rectilinear running of the robot according to the embodiment of the present invention, and FIG. 3 is a block diagram for illustrating the fuzzy inference apparatus of an obstacle avoidance running of the robot according to the embodiment of the present invention.

In FIGS. 1, 2 and 3, reference numeral 1 is driving control means for controlling a running of the robot, wherein the driving control means 1 is comprised by a left running motor 2 and a right running motor 3 respectively attached by driving wheels (not shown), left running motor driving control means 4 and right running motor driving control means 5 for controlling drives of the left and right running motors 2 and 3.

Reference numeral 6 is running distance detecting means comprised by a left distance detecting sensor 7 and a right distance detecting sensor 8 in order to output to a central processing unit (described later) pulse signals proportionate to revolutions of the left and right driving wheels.

Reference numeral 9 is direction angle detecting means for detecting whether or not there is any variation in running directions of the robot.

Reference numeral 10 is obstacle detecting means for transmitting ultrasonic waves forward of a robot from an ultrasonic wave sensor disposed forward of the robot to thereafter to receive a signal, e.g., and echo signal reflected from a wall or the obstacle, thereby detecting the obstacle lying in front of the robot or a distance to the obstacle.

Reference numeral 11 is a central processing unit (CPU) for performing an operation for a present position of the robot according to a running direction data input from the directional angle detecting means 9 and a running distance data input from the running distance detecting means 6, and performs an operation for a distance to the obstacle according to an obstacle detecting data from the obstacle detecting means 10, and performs a fuzzy inference by way of rectilinear, constant and obstacle avoidance fuzzy inference means so that the robot can appropriately carry out a rectilinear running, constant speed running and obstacle avoidance running of the robot according to results carried out thereby.

A fuzzy inference of the fuzzy inference means with regard to the rectilinear and constant speed runnings according to the present invention will now be described with reference to FIG. 2.

When the self-propelled mobile robot according to the present invention starts to run, CPU 11 receives at a predetermined period of interval a running distance and a directional angle data from the running distance detecting means 6 and the directional angle detecting means 9 and performs an operation for a directional angle against a position coordinate and an absolute position by way of position distinguishing means 18 comprised by position coordinate operating means 12 and directional angle operating means 13, so that results thereof can be input to rectilinear running fuzzy inference means 14 to control the rectilinear running of the robot and thereby to calculate a rectilinear control output variation magnitude ($\Delta Ud$) of the left and right running motors 2 and 3.

Furthermore, the directional angle data detected from the directional angle detecting means 9, along with position coordinate output from the position coordinate operating means 12 and the directional angle operating means 13 and the directional angle data about the absolute position, is input to first weight operating means 16, so that operated results thereof can be calculated in a weight m of the rectilinear control output variation magnitude ($\Delta Ud$).

The weight m output from the first weight operating means 16 is multiplied operated by an operator with the rectilinear control output variation magnitude ($\Delta Ud$), to thereby output a rectilinear control weighted output variation magnitude (m·$\Delta Ud$)

At this time, the weight m serves to compensate a vibration phenomenon caused by the left and right running motors 2 and 3 when control output values of the same change, to thereby bolt from a normal ordinary track due to inertia thereof, because the motors 2 and 3 cannot cope with the changes quickly.

Meanwhile, the running distance data of the left and right driving wheels detected from the running distance detecting means 6 is compared with a reference speed previously established at the CPU 11, and the compared result thereof is input to constant speed running fuzzy inference means 17, along with obstacle distance data detected by the obstacle distance detecting means 10, so that a constant speed control output variation magnitude ($\Delta Uf$) of the running motor for enabling a constant speed running of the robot can be calculated.

The rectilinear control weighted output variation magnitude (m·$\Delta Ud$) and the constant speed control output variation magnitude ($\Delta Uf$) respectively calculated from the foregoing are operated with prior output magnitudes of the left and right running motors $U_l$ (K−1) and $U_r$ (K−1), thereby causing final output magnitudes to be calculated in the following manner.

In the final output magnitude calculated in the above, an output magnitude $\{U_l(K)\}$ of the left running motor 2 is $$U_l(K)=U_l(K-1)+m\cdot\Delta Ud+\Delta Uf,$$

where K is a constant, and an output magnitude $\{U_r(K)\}$ of the right running motor 3 is $$U_r(K)=U_r(K-1)-m\cdot\Delta Ud+\Delta Uf,$$

where K is a constant.

At this time, the output magnitudes of the left and right running motors 2, and 3 thus determined are caused to generate respective pulse width modulation (PWM) signals from left and right running motor drive control means 4 and 5, to thereby drive the left and right running motors 2 and 3.

A fuzzy inference of the fuzzy inference means with regard to obstacle avoidance running according to the present invention will now be described with reference to FIGS. 3, 16 and 17.

Figure 16:
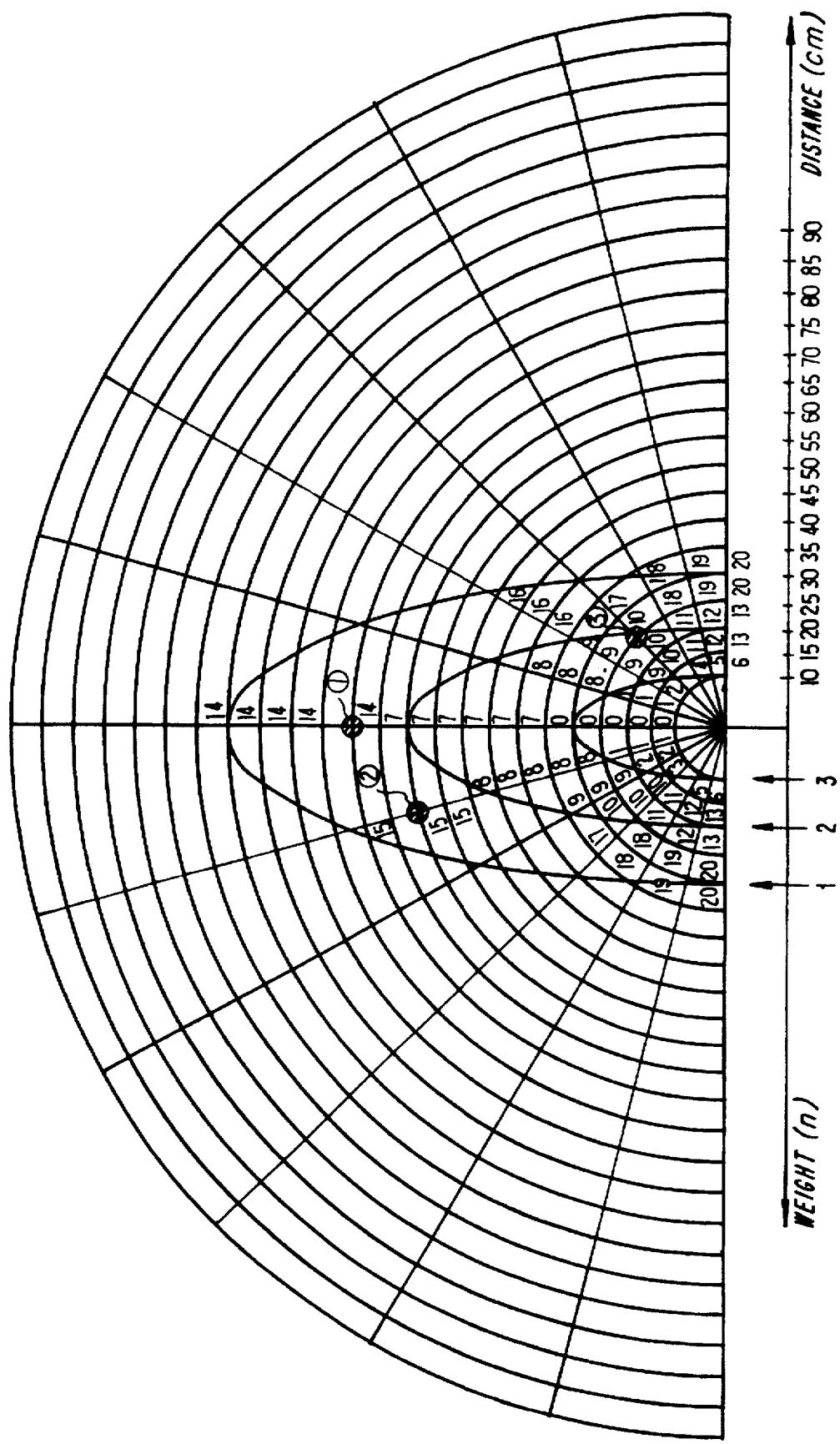
FIG. 16 is a schematic diagram for illustrating a graph for seeking an output weight and an importance degree against the obstacle according to an embodiment of the present invention.
Figure 17:
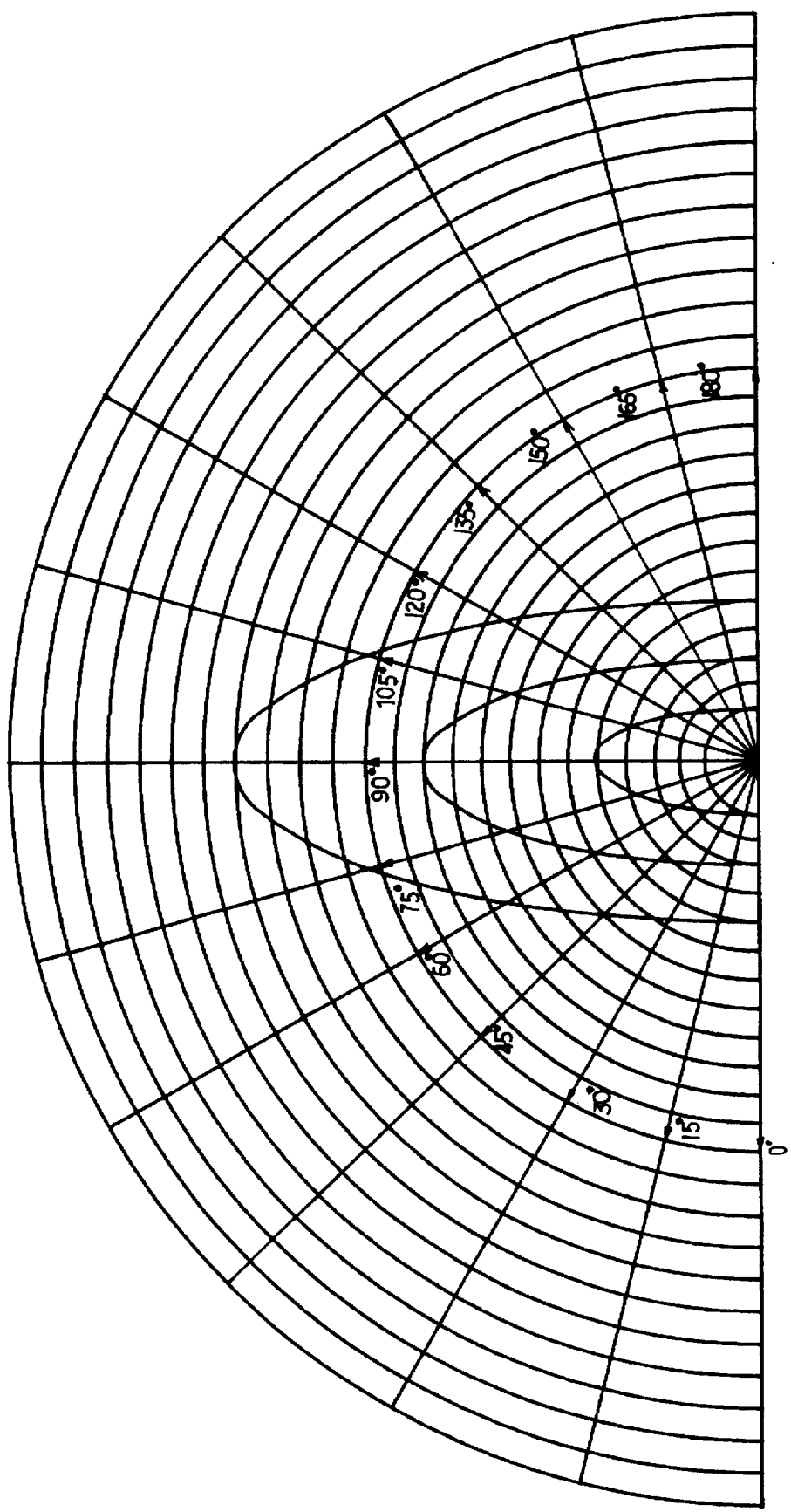
FIG. 17 is a schematic diagram for illustrating a graph for seeking a target running direction with regard to directions of the obstacle according to an embodiment of the present invention.

FIG. 16 is a schematic diagram for illustrating a tabulation for seeking an output weight and an importance degree of an obstacle according to the embodiment of the present invention, and FIG. 17 is a schematic diagram for illustrating a tabulation for seeking a target running direction with regard to directions of the obstacle according to the embodiment of the present invention.

The self-propelled mobile robot performs a fuzzy inference according to obstacle avoidance fuzzy inference means 20 when an obstacle obstructing a normal running of the robot appears on a travelling route thereof during performing a normal running on a designated route according to a fuzzy inference result of the rectilinear running fuzzy inference means 14.

Information on the distance to the obstacle and an obstacle angle obtained by the robot during the running from the obstacle distance detecting means 10 is comparatively operated with data previously prepared before the running thereof at obstacle position operating means 22, e.g., the data illustrated in the tabulation of FIG. 16 regarding the importance degree and output weight of the obstacle for determining an order in witch obstacles are to be avoided.

Accordingly, if a relative position of the obstacle corresponds to the obstacle avoidance domain described in FIG. 16, the relative position of the obstacle is caused to be stored in memory means (not shown) of the CPU 11 and to be received by the obstacle avoidance fuzzy inference means 20, to thereby perform the fuzzy inference.

If, however, the position of the detected obstacle does not correspond to the obstacle avoidance domain, an original rectilinear running fuzzy inference is continuously proceeded.

When a position data of the obstacle corresponding to the obstacle avoidance domain among a plurality of detected obstacles is input to the obstacle position operating means 22, the CPU 11 selects an obstacle supposed to be preferentially avoided among the plurality of obstacles.

At this location, if position data on three obstacles (①, ② and ③) are input to the obstacle position operating means 22, as illustrated in FIG. 16, the obstacle located at a position of ③ is selected as one to be preferentially avoided according to the tabulation of the importance degree of the obstacle.

In the above description, when the obstacle to be avoided is selected, a final target running direction is calculated, with reference to the tabulation predrawn before the running of the robot, e.g., a tabulation for seeking a target running direction in FIG. 17, by the running direction against a corresponding obstacle being selected at 135 degrees to thereafter be added to a target running direction on an original travel route.

At this time, if the original target running direction is 180 degrees, the final target running direction becomes 135 degrees.

The calculated target running direction, as illustrated in FIG. 3, is input to the obstacle avoidance fuzzy inference means 20 to thereby calculate the direction control output variation magnitude ($\Delta Ua$) for controlling the running direction.

Furthermore, the information operated by the obstacle position operating means 22 is applied to a second weight operating means 21 to thereby calculate a weight (n) with regard to the obstacle avoidance, and the calculated output variation magnitude ($\Delta Ua$), as illustrated in FIG. 16, is multiply operated by the output weight (n) according to the distance to the obstacle, thereby calculating a final direction control weighted output variation magnitude (n·$\Delta Ua$).

The direction control weighted output variation magnitude (n·$\Delta Ua$) and the constant speed control output variation magnitude ($\Delta Uf$) of the running motor respectively calculated in the foregoing description are operated by prior output magnitudes $U_l$ (K−1) and $U_r$ (K−1) of the left and right running motors 2 and 3, to thereby calculate a following final output magnitude.

The output magnitude $\{U_l(K)\}$ of the left running motor 2 in the above-calculated final output magnitude is $$U_l(K)=U_l(K+1)+n\cdot\Delta Ua+\Delta Uf$$

where K is a constant, and the output magnitude $\{U_r(K)\}$ of the right running motor 3 is $$U_r(K)=U_r(K-1)-n\cdot\Delta Ua+\Delta Uf$$

where K is a constant.

The output magnitudes of the left and right running motors 2 and 3 thus determined are data for driving the left and right running motors 2 and 3 by generating respective pulse width modulation (PWM) signals from the left and right running motor drive control means 4 and 5 when an obstacle appears on the travel route.

Now, rectilinear running and constant speed running fuzzy inference means will be described with reference to FIGS. 5 to 13.

Figure 5:
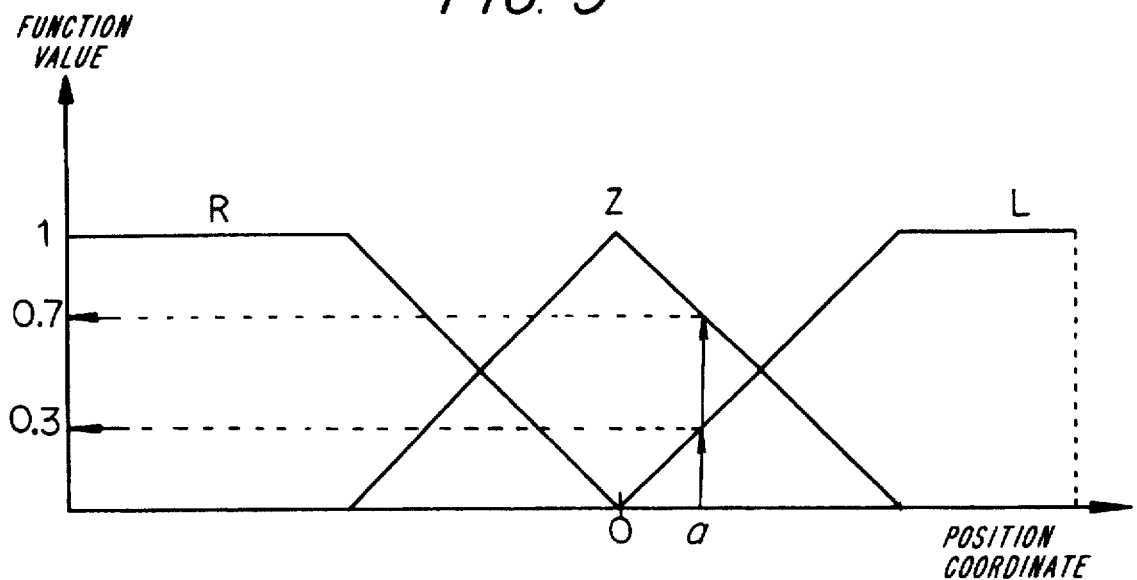
FIG. 5 is a schematic diagram for illustrating a function value against a position coordinate of the rectilinear running fuzzy inference means.

FIG. 5 is a schematic diagram for illustrating a function value against a position coordinate of rectilinear running fuzzy inference means, wherein, reference symbol Z represents that a running position of the robot is on a "normal track", R denotes that the running position of the robot is "positioned right" of the normal track (Z), and reference symbol L shows that the running position of the robot is "situated left" of the normal track (Z).

Figure 6:
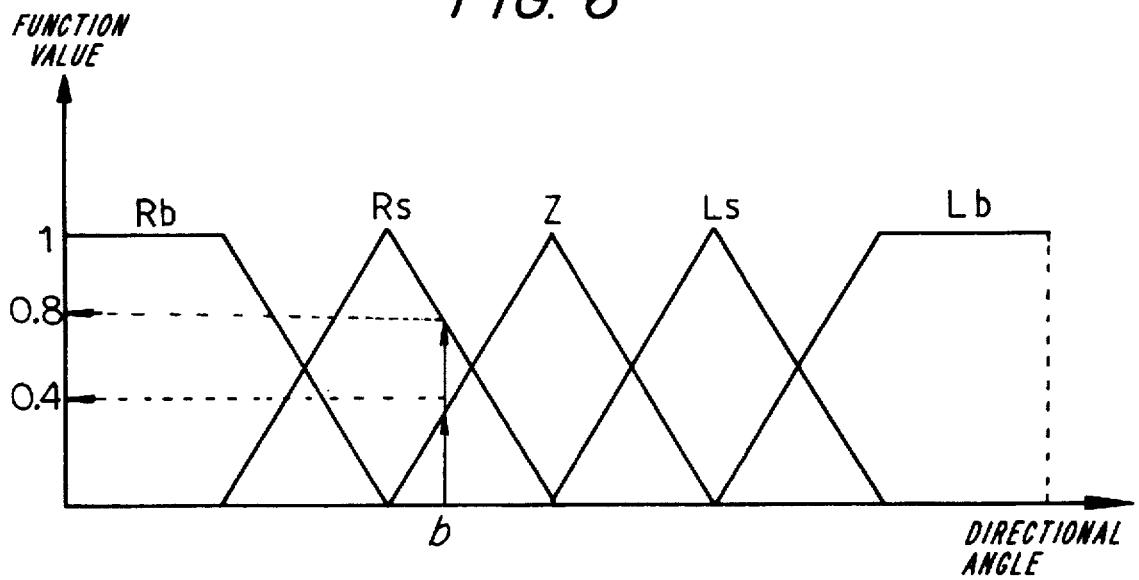
FIG. 6 is a schematic diagram for illustrating a function value against a directional angle of the rectilinear running fuzzy inference means.

FIG. 6 is a schematic diagram for illustrating a function value against a directional angle of the rectilinear running fuzzy inference means, wherein, reference symbol Z represents that the running direction of the robot is "normal", Rs denotes that the running direction of the robot is "a little tilted to the right", Rb indicates that the running direction of the robot is "much tilted to the right", Ls shows that the running direction of the robot is "a little tilted to the left" and reference symbol Lb represents that the running direction of the robot is "much tilted to the left".

Figures 7, 8:
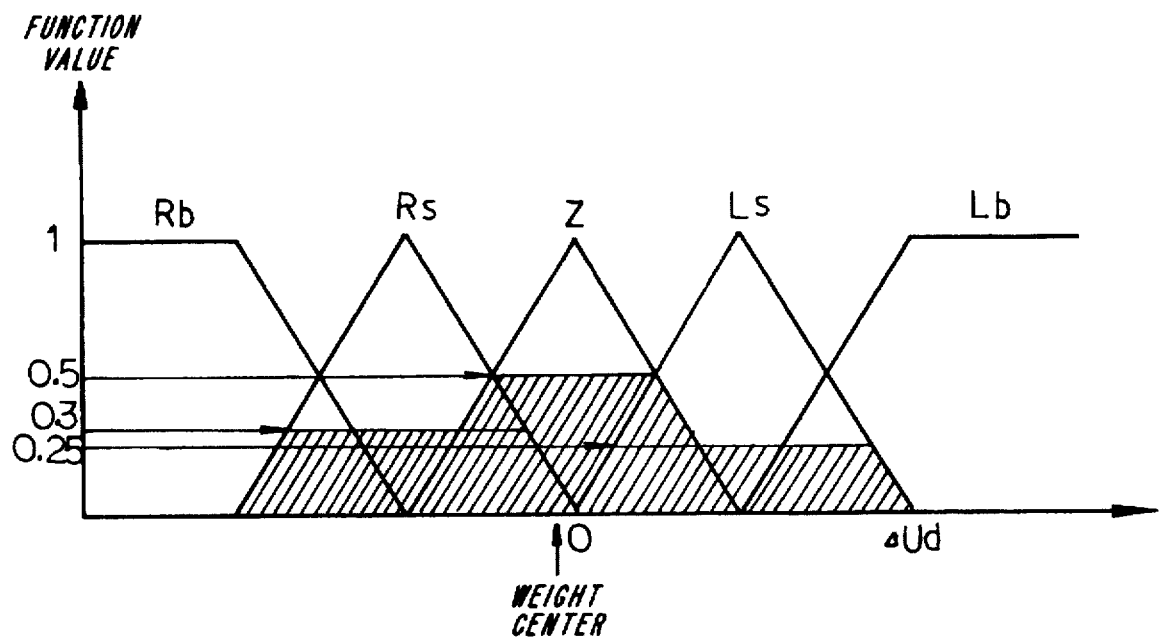
FIG. 7 is a schematic diagram for illustrating in a discrete tabulation an output fuzzy function against the directional angle of the rectilinear running fuzzy inference means and the position coordinate.
FIG. 8 is a schematic diagram for illustraing a function corresponding to rectilinear control output variation magnitude according to the rectilinear running fuzzy inference.

FIG. 7 is a schematic diagram for illustrating in a discrete tabulation an output fuzzy function against the directional angle input and the position coordinate, wherein, reference symbol Z represents "output invariable", Rs indicates that "a right side output is slightly increased", implying that an output of the left running motor 2 should be increased, Rb denotes that "a right side output is much increased", Ls implies that "a left side output is slightly increased", and Lb shows that "the left side output is much increased".

For instance, if the directional angle input of the robot is Rb, and position coordinate input is Z in FIG. 7, the output function is Rb, so that CPU 11 outputs a control signal to drive control means 1 to thereby increase a rotary speed of the right running motor 3, and if the directional input is Z, and position coordinate input is R, the output function is Rs, so that CPU 11 outputs the control signal to the drive control means 1 to thereby increase the rotary speed of the right running motor 3.

Values of Rs, Rb, Z, Ls and Lb in the foregoing are pre-established in the CPU 11.

FIG. 8 is a schematic diagram for illustrating a graph for seeking a function corresponding to the rectilinear control output variation magnitude according to the rectilinear running fuzzy inference, where areas constituted by respective function value are calculated from respective output function value sought from FIGS. 5, 6 and 7, and a weight center of the areas is calculated to thereby be taken as the rectilinear control output variation magnitude ($\Delta$Ua).

Now, a process of seeking the rectilinear control output variation magnitude ($\Delta$Ua) will be described in numerical detail with reference to FIGS. 5, 6, 7 and 8.

First of all, if it is discriminated that a present position coordinate of the robot is situated at "a" point, CPU 11 will take a function value against a fuzzy variable Z as 0.7 and take a function value against a fuzzy variable L as 0.3.

When a directional angle detected from the running direction of the robot is discriminated as "b" point after respective function values of the fuzzy variables Z and L, a function value of fuzzy variable Z is taken as 0.4, and a function value of fuzzy variable Rs is taken as 0.8. Then the discrete distribution of FIG. 6 is substituted by reversion rates of respective fuzzy variables.

As a result of the foregoing, if calculation is so made that a fuzzy variable Ls is 0.25, Z is 0.5 and Rs is 0.3, areas of Rs, Z and Ls are obtained according to the tabulation in FIG. 7 with regard to respective values of the fuzzy variables calculated in the foregoing, and when a weight center is obtained from the areas, this weight center is now taken as rectilinear control output variation magnitude ($\Delta$Ua).

Figure 9:
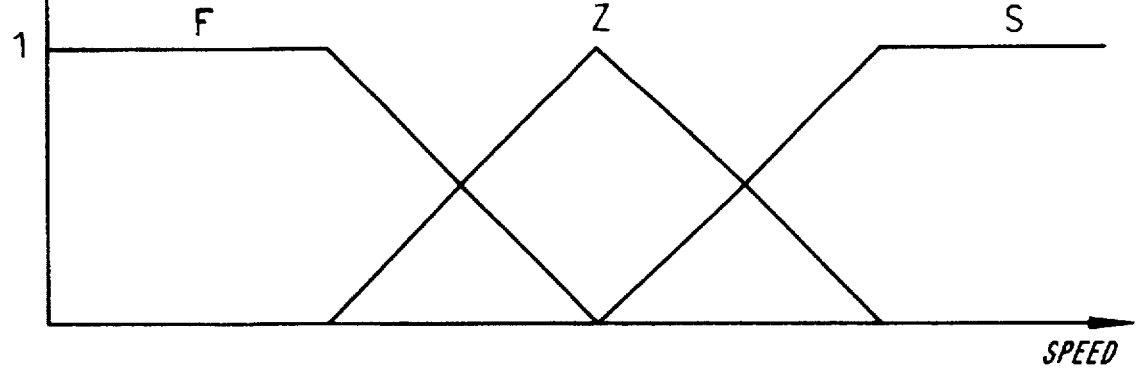
FIG. 9 is a schematic diagram for illustrating a function value against a speed of the constant speed running fuzzy inference means.

FIG. 9 is a schematic diagram for illustrating a function value against a speed of the constant speed running fuzzy inference means, wherein, a function value (F) against the speed obtained by comparison between the running distance detecting means 6 and previously memorized reference speed is defined as "fast", a function value (Z) as "normal" and a function value (S) as "slow".

Figure 10:
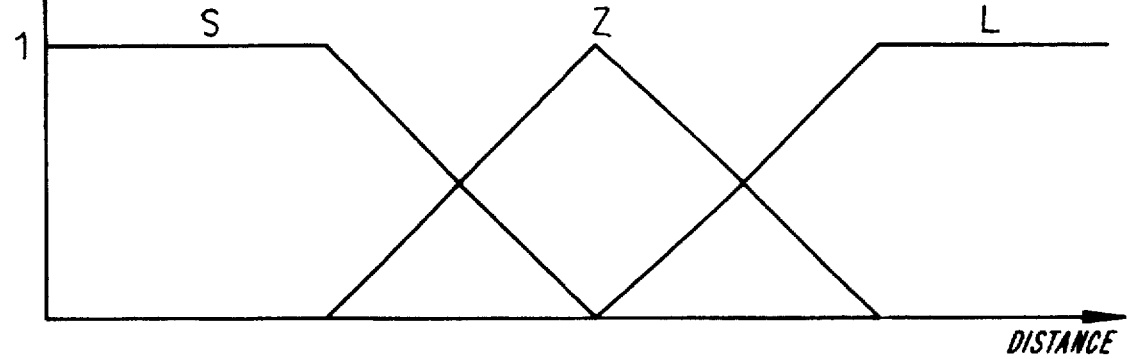
FIG. 10 is a schematic diagram for illustrating a function value against a distance to an obstacle in the constant running fuzzy inference means.

FIG. 10 is a schematic diagram for illustrating a function value against a distance to an obstacle, wherein, the function value (S) to the obstacle is represented as "near", the function value (Z) as "normal" and the function value (L) is defined as "far".

Furthermore, FIG. 11 is a schematic diagram for illustrating in a discrete tabulation an output fuzzy function against the speed of the constant speed running fuzzy inference means and the distance to the obstacle, wherein, the output function, i.e., the function value (S) is represented as "output decrease", (Z) as output invariable, and the function value (B) as "output increase".

The function values (S, Z, B) in the foregoing are pre-established in their values at the CPU 11.

FIG. 12 is a schematic diagram for illustrating a function corresponding to the constant control output variation magnitude, where, areas constituted by respective function values are calculated from respective output function values obtained from FIGS. 8, 9, 10 and 11, a weight center thereof is obtained and the weight center value obtained from the above is taken as the constant speed control output variation magnitude ($\Delta$Uf).

Here, the results according to FIGS. 9, 10, 11 and 12 serve to calculate the constant speed control output variation magnitude ($\Delta$Uf) by way of the same steps of inference method as explained in FIGS. 5, 6, 7 and 8.

FIG. 13 is a schematic diagram for illustating a tabulation for seeking a weight (m) of the rectilinear control output variation magnitude according to values of the position coordinate, directional angle and instantaneous directional angle.

The weight is given differently according to the current running state of the robot to thereby maximize an effect of the rectilinear control output.

Now, obstacle avoidance fuzzy inference means will be described with reference to FIGS. 14 and 15.

Figure 14:
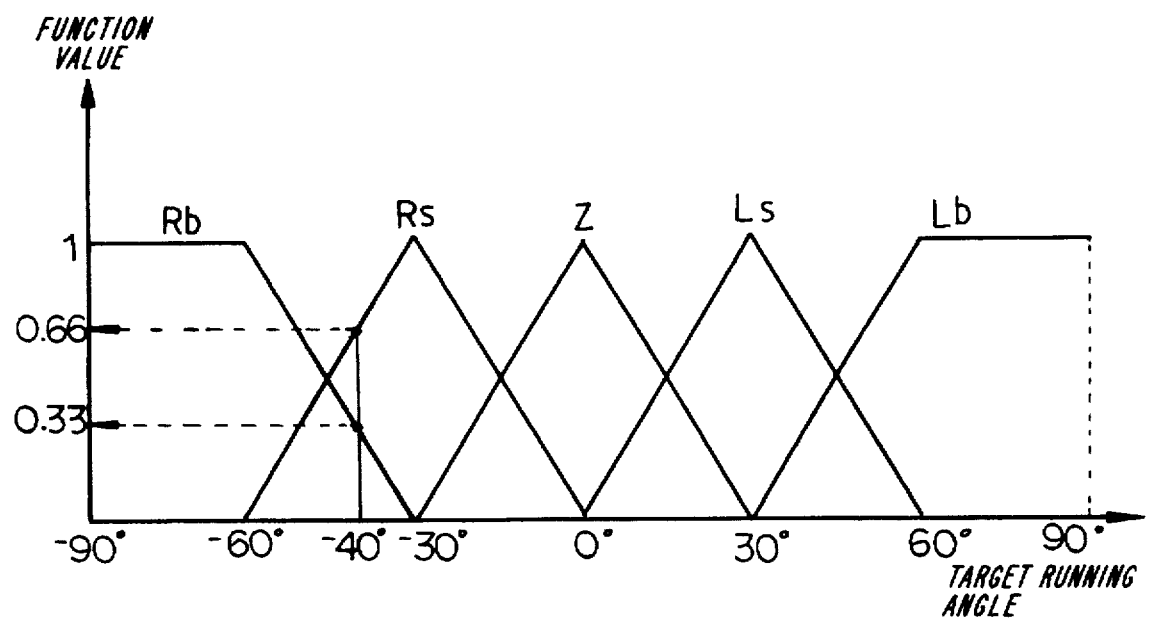
FIG. 14 is a schematic diagram for illustrating a function value against a target running angle of the obstacle avoidance fuzzy inference means.
Figure 15:
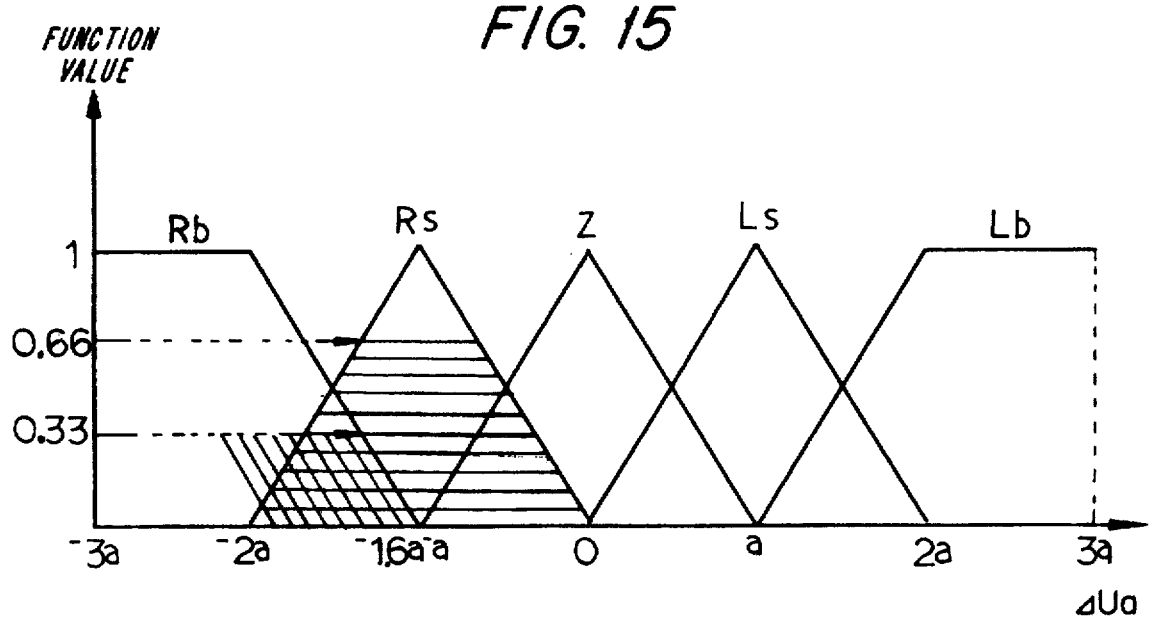
FIG. 15 is a schematic diagram for illustrating a function corresponding to a directional control output variation magnitude of the obstacle avoidance fuzzy inference means.

FIG. 14 is a schematic diagram for illustrating a function value against a target running angle of obstacle avoidance fuzzy inference means and FIG. 15 is a schematic diagram for illustrating a function corresponding to a directional control output variation magnitude of the obstacle avoidance fuzzy inference means.

In FIG. 14, reference numeral Rb represents "extremely leaned toward right", Rs defines "a little leaned toward right", Ls indicates "a little leaned toward left", and Lb shows "extremely leaned toward left".

At this location, if a target running direction is 135 degrees due to the obstacle regardless of the current running direction of the robot, an input value of the obstacle avoidance fuzzy inference means 20 becomes 135, resulting in Rs=0.66 and Rb=0.33 and other function values becoming 0.

In FIG. 15, reference numeral Rb represents "right output extremely increased", Rs defines "right output a little increased", Z indicates "output invariable", Ls indicates "left output a little increased", and Lb shows "left output extremely increased".

At this location, the function value obtained from FIG. 14 applies as is to that of FIG. 15, so that Rs=0.66 and Rb=0.33.

Areas constituted by respective function values are calculated and a weight center thereof is obtained and if value thereof is taken as the direction control output variation magnitude ($\Delta$Ua), $\Delta$Ua=$-$1.6a.

Furthermore, if N=2 is selected according to the graph for seeking an output weight in FIG. 16, to thereby be multiplied by the direction control output variation magnitude (ΔUa), the direction control weight output variation magnitude (n·ΔUa) becomes −3.2a, thereby increasing an output of the right running motor 3 and decreasing an output of the left running motor 2, so that the robot can change the running direction to the left.

Hereinafter, an automatic running method of the robot according to the embodiment of the present invention will be described in detail with reference to FIG. 4.

Figure 4A:
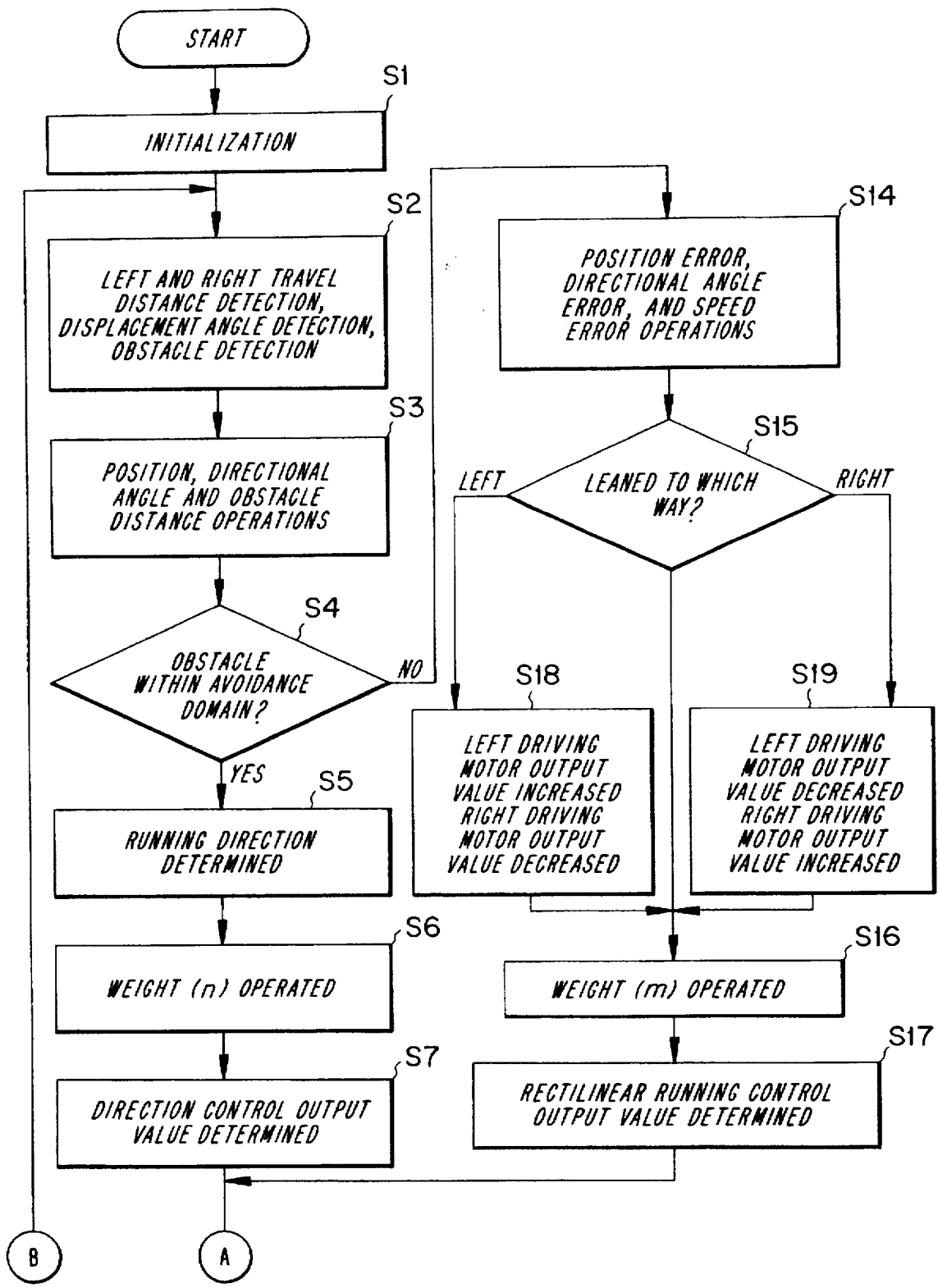
FIGS. 4A, B are a flow charts for illustrating an automatic running control method of the robot according to an embodiment of the present invention.
Figure 4B:
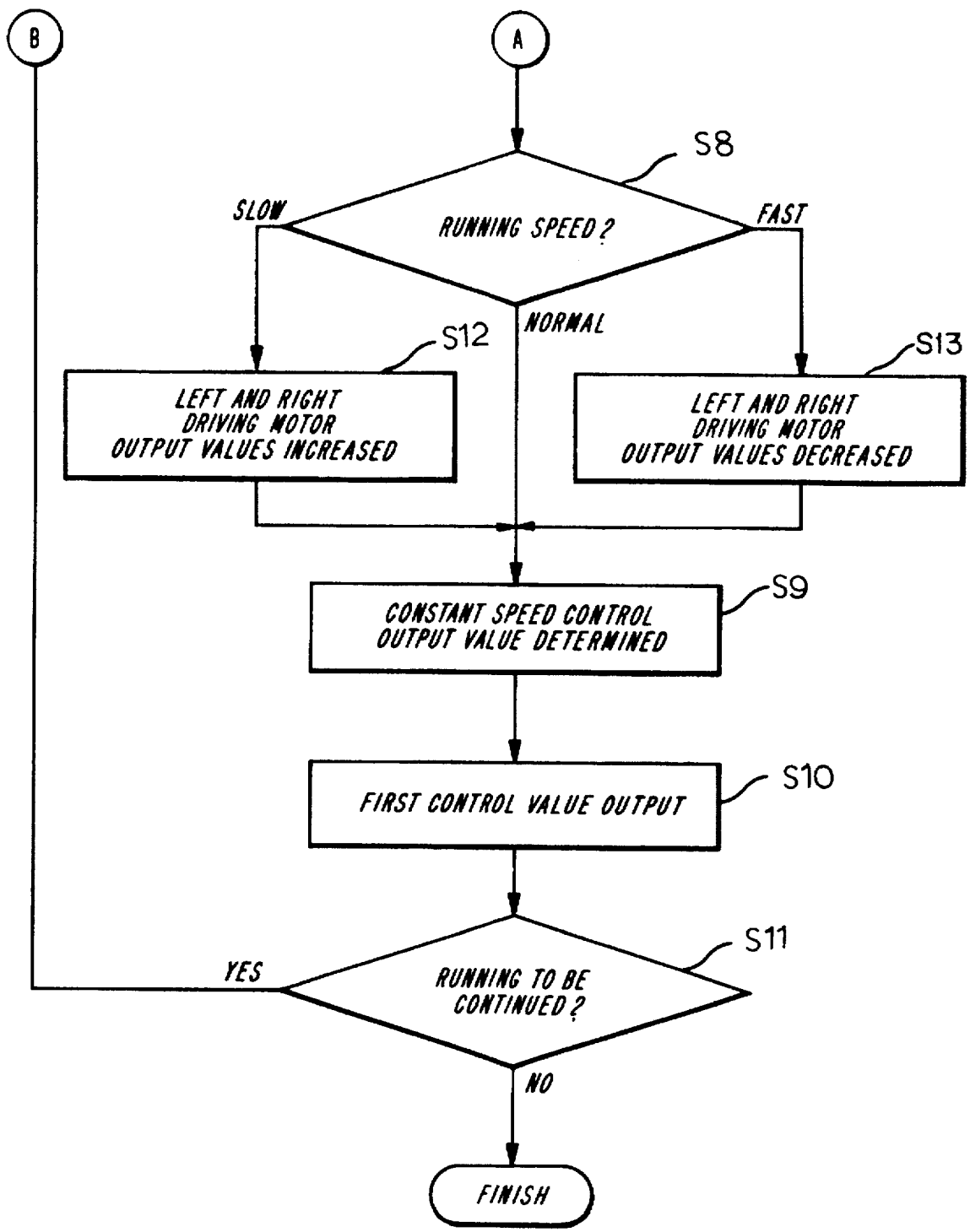

FIG. 4 is a flow chart for illustrating an automatic running control method of the robot according to the embodiment of the present invention, where reference symbol S indicates step.

First of all, when a user switches on an operation switch of the self-propelled robot according to the present invention, the robot is initialized at step S1, and becomes ready in a state of starting an operation according to an operational command input by the user.

Next, at step S2, a displacement of the robot, i.e., a running distance with regard to the directional angle and left and right travelling distance, is detected by the directional angle detecting means 9 and running distance detecting means 6, and at the same time, a distance to the obstacle and whether or not there is any obstacle along the travelling route of the robot are detected by the obstacle detecting means 10.

At step S3, an operation is performed at CPU 11 by the position coordinate operating means 12 and directional angle operating means 13, based on the running distance and the directional data detected at step S2, to thereby calculate a position coordinate of the robot and a directional angle with regard to an absolute position, and the obstacle position operating means 22 utilizes the information detected by the obstacle detecting means 10 to calculate a distance to the obstacle and a position thereof.

Furthermore, the constant speed running fuzzy inference means 17 performs a fuzzy inference with regard to a constant speed based on a value compared between the data detected from the running distance detecting means 6 and the reference data, thereby calculating a current speed of the robot.

When the position coordinate of the robot, directional data with regard to the absolute position, distance to the obstacle, distance data to the obstacle and speed of the robot are calculated at said step S3, a discrimination is made as to whether or not the obstacle detected in the foregoing exists in a domain pre-established in CPU 11, i.e., exists in an avoidance domain illustrated in FIG. 16 (step S4), and if it is discriminated that the obstacle detected in the step S4 exists in the avoidance domain (in case of yes), flow proceeds to step S5, and the distance to the obstacle calculated in the obstacle position operating means 22 and the position data thereof are input to the obstacle avoidance fuzzy inference means 20, which in turn calculates a direction control output variation magnitude (ΔUa).

When the direction control output variation magnitude (ΔUa) is calculated from the obstacle avoidance fuzzy inference means 20 at the step S5, CPU 11 receives data about the distance to the obstacle calculated at the step S3 through the second weight operating means 21 and a position thereof, thereby calculating a weight (n). (step S6)

When the weight (n) data is calculated from the second weight operating means 21 at the step S6, CPU 11, at step S7, discriminates a direction control output value according to the result calculated therefrom at the step S6, and calculates a direction control weight output variation magnitude (n·ΔUa).

When the direction control output value is calculated at the step S7, CPU 11 discriminates at step S8, whether the running speed of the robot is slow, fast or at a normal speed according to the operational result with regard to the constant speed calculated at the step S3, and if it is discriminated at the step S8 that the running speed of the robot is at the normal speed (in case of normal), flow proceeds to step S9, where the CPU 11 discriminates a constant speed control output value according to the result calculated therefrom. In other words, the CPU 11 serves to calculate a constant speed control output variation magnitude (ΔUf).

When the constant speed control output variation magnitude (ΔUf) is calculated at the step S9, flow advances to step S10, where the CPU 11 discriminates control values of the left and right running motors 2 and 3 according to the result calculated therefrom and serves to generate a final output control value.

In other words, the direction control weight output variation magnitude (n·ΔUa) and the constant speed control output variation magnitude (ΔUf) of the running motor respectively calculated from the foregoing are operated with previous output magnitudes of left and right running motors, $U_l(K-1)$ and $U_r(K-1)$, to thereby calculate a following final output control value, i.e., a final output magnitude.

An output magnitude $\{U_l(K)\}$ of the left running motor 2 in the final output magnitude is:

$$U_l(K)=U_l(K+1)+n \cdot \Delta Ua+\Delta Uf,$$

where, K is constant.

An output magnitude $\{Ur(K)\}$ of the right running motor 3 is:

$$U_r(K)=U_r(K-1)-n \cdot \Delta Ua+\Delta Uf,$$

where K is constant.

At this time, the output magnitudes of the left and right running motor 2 and 3 thus determined are data for driving the left and right running motors 2 and 3 by generating respective pulse width modulation PWM signals from the left and right running motor driving control means 4 and 5.

When the final control value is generated at the step S10, the CPU 11 discriminates at step S11 whether or not the robot should be continuously run, and if it is discriminated that the robot should be kept running (in case of yes), operations subsequent to step 2 are repeatedly performed.

If it is discriminated that the robot should not be running continuously (in case of no), the automatic running of the robot is terminated.

Meanwhile, if it is discriminated at step S8 that the running speed of the robot is slow (in case of slow), flow proceeds to step S12, where the CPU 11 serves to control the left running motor driving means 4 and the right running motor driving means 5 to thereby control the driving means 1, and serves to increase the output values of the left and right running motors 2 and 3 to thereby increase rotary speeds of the left and right driving wheels. Then operations subsequent to the step S9 are repeatedly performed.

Meanwhile, if it is discriminated that the running speed of the robot is fast (in case of fast), flow advances to step S13, where the CPU 11 decreases the output values of the left and right running motors 2 and 3 to thereby decrease rotary speeds of the left and right driving wheels. Then operations subsequent to the step 9 are repeatedly performed.

If it is discriminated at the step S4 that the obstacle is not located within the avoidance domain (in case of no), the CPU 11 utilizes at step S14 the data calculated in the steps 2 and 3 to thereafter perform an error operation on the rectilinear running, so that the data about the position coordinate and directional angle with regard to the absolute position detected in the foregoing can be input to the rectilinear running fuzzy inference means 14 for performing a fuzzy inference with regard to the rectilinear running according to the fuzzy rule, and the rectilinear running fuzzy inference means 14 can serve to calculate the rectilinear control output variation magnitude (ΔUd) according to the fuzzy inference.

In other words, the position coordinate and function value against the directional angle are obtained according to the graphs in FIGS. 5 and 6, and the result thereof is calculated according to the discrete distribution illustrated in FIG. 7.

According to the result calculated therefrom, areas constituted by respective function values are obtained as illustrated in FIG. 8, and when a weight center of the areas is obtained, the rectilinear control output variation magnitude (ΔUd) can be calculated as a result therefor.

Furthermore, the CPU 11 serves to detect the running distance by way of the running distance detecting means 6 constituted by the left distance detecting sensor 7 and the right distance detecting sensor 8, and the constant speed running fuzzy inference means 17 receives the data detected from the obstacle distance detecting means 10 and a value obtained by comparative operation of the reference speed and running distance data of the left and right running motors 2 and 3 detected at the running distance detecting means 6, to thereby perform a fuzzy inference with regard to the constant speed running, so that the constant speed control output variation magnitude ΔUf of the running motor can be calculated.

In other words, function value with regard to the speed and running distance according to the graphs in FIGS. 9 and 10 is obtained and a result thereof is calculated according to the discrete distribution illustrated in FIG. 11.

According to the afore-calculated result, as illustrated in FIG. 12, when areas covered by each function value are obtained and a weight center thereof is obtained, the constant speed control output variation magnitude ΔUf of the running motor can be calculated as a result thereof.

When an error operation is performed at the step 14 on the rectilinear running and the constant running and a result thereof is calculated, the CPU 11 discriminates at step S15 to which direction the running direction of the robot is leaned according to the error operation result with regard to the rectilinear running calculated in the foregoing, in other words, discriminates whether the running direction is extremely leaned left, extremely leaned right or in the normal track.

If it is discriminated at step S15 that the robot is running on the normal track (in case of normalcy), flow proceeds to step S16, where, the CPU 11 receives the position coordinate calculated at the step S13 through the first weight operational means 16, the directional angle data with regard to the absolute position and the data detected by the directional angle detecting means 9, to thereby calculate a weight (m).

When the weight (m) data is calculated from the first weight operating means 16 at the step S16, flow advances to step S17, where the CPU 11 serves to discriminate a rectilinear control output value according to the result calculated therefrom, i.e. , serves to calculate a rectilinear control weight output variation magnitude (m·ΔUd), and performs operations subsequent to step S8 repeatedly.

At this location, if the obstacle is not within the avoidance domain, a final output magnitude with regard to the rectilinear running can be described in the following way, wherein an output magnitude {U$_l$ (K)} of the left running motor 2 can be obtained as:

$$U_l(K)=U_l(K+1)+m\cdot\Delta Ud+\Delta Uf$$

where K is a constant, and an output magnitude {U$_r$(K)} of the right running motor 3 can be obtained as:

$$U_r(K)=U_r(K-1)-m\cdot\Delta Ud+\Delta Uf$$

where K is a constant.

At this time, the output magnitudes of the left and right running motors 2 and 3 thus determined serve to generate respective PWM signals from the left and right running motor drive control means 4 and 5 to thereby drive the left and right running motors 2 and 3.

Meanwhile, if it is discriminated as a result of the operation result of the CPU 11 that the robot is leaned to the left in its running direction (in case of left), flow advances to step S18, where the CPU 11 serves to control the left running motor drive control means 4 according to the data with regard to the rectilinear running calculated therefrom to thereby increase an output of the left running motor 2 and to increase the rotary speed of the left driving wheel. The CPU 11 at the same time serves to control the right running motor driving control means 5 to decrease output of the right running motor 3 and performs the operations subsequent to the step S16 repeatedly.

Meanwhile, if it is discriminated at the step S15 as a result of the operation at the CPU 11 that the running direction of the robot is leaned toward the right direction (in case of right), flow proceeds to step S19, where the CPU 11 serves to control the right running motor drive control means 5 according to the data with regard to the rectilinear running calculated therefrom, to increase output of the right running motor 3 and to thereby increase the rotary speed of the right driving wheel.

The CPU 11 at the same time controls the left running motor drive control means 4 to thereby decrease output of the left running motor 2 and performs operations subsequent to the step S16 repeatedly.

As apparent from the foregoing, the automatic running control apparatus of a robot and a method thereof according to the present invention utilizes information about a travel distance of a running wheel, direction of the robot and an obstacle, when the robot moves along a rectilinear distance to thereby perform the fuzzy inference, so that the robot can maintain a running speed without straying from a normal track during a rectilinear running thereof to thereby run to a target accurately.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An automatic running control apparatus for a robot, the apparatus comprising:

running distance detecting means for detecting a distance the robot has traveled;

directional angle detecting means for detecting a change in a running direction of the robot;

position discriminating means for determining a present absolute position of the robot based on data detected by the directional angle detecting means;

obstacle detecting means for detecting the presence of an obstacle around the robot and for detecting a distance to the obstacle;

obstacle position operation means for determining a comparative position of the robot based on information obtained from the directional angle detecting means and obstacle detecting means;

obstacle avoidance fuzzy inference means for performing a fuzzy inference for determining the running direction of the robot by utilizing information obtained from the obstacle position operation means;

rectilinear running fuzzy inference means for performing a fuzzy inference for rectilinear running of the robot by utilizing information obtained from the position discriminating means;

constant speed running fuzzy inference means for performing a fuzzy inference for speed control of the robot by utilizing running speed data obtained from the running distance detecting means and distance data to the obstacle obtained from the obstacle detecting means; and driving control means for controlling movement of the robot based on at least one of the fuzzy inferences performed by the obstacle avoidance fuzzy inference means, the rectilinear running fuzzy inference means, and the constant speed running fuzzy inference means.

2. An automatic running control apparatus for a robot as defined in claim 1, further comprising weight operating means for determining a weight for a position correction based on data received from the position discriminating means and the directional angle detecting means.

3. An automatic running control method for a robot, the method comprising the steps of:

determining a robot position based on a travel distance and an angular displacement of the robot;

determining obstacle positions based on a distance and a directional angle of obstacles relative to the robot;

determining whether each obstacle is located within an avoidance domain of the robot based on the robot position and the obstacle position;

determining a weighted direction correction value based on an order in which obstacles in the avoidance domain are to be avoided;

determining a running speed of the robot after the determination of the weighted direction correction value;

determining whether the running speed is fast, slow, or normal relative to a reference running speed;

determining a constant speed correction value;

driving the robot based on the weighted direction correction value and the constant speed correction value; and stopping an automatic running of the robot when the robot is not running continuously responsive to the determination of the constant speed correction value.

4. The method of claim 3, further comprising the step of increasing left and right motor speeds when it is determined that the running speed of the robot is slow relative to the reference speed.

5. The method of claim 3, further comprising the step of decreasing left and right motor speeds when it is determined that the running speed of the robot is fast relative to the reference speed.

6. The method of claim 3, further comprising a step of determining a weighted rectilinear running correction value if the obstacle is not located within the avoidance domain; and wherein the step of determining whether a running speed of the robot is fast, slow, or normal is performed after determination of the weighted rectilinear running correction value, when a running direction of the robot is normal.

7. The method of claim 3, further comprising the steps of:

increasing a left motor speed and decreasing a right motor speed when the running direction of the robot is to the left of a desired direction; and increasing the right motor speed and decreasing the left motor speed when the running direction of the robot is to the right of a desired direction.

\* \* \* \* \*